INVENTOR:
HOMER J. SHAFER
ATTORNEY.

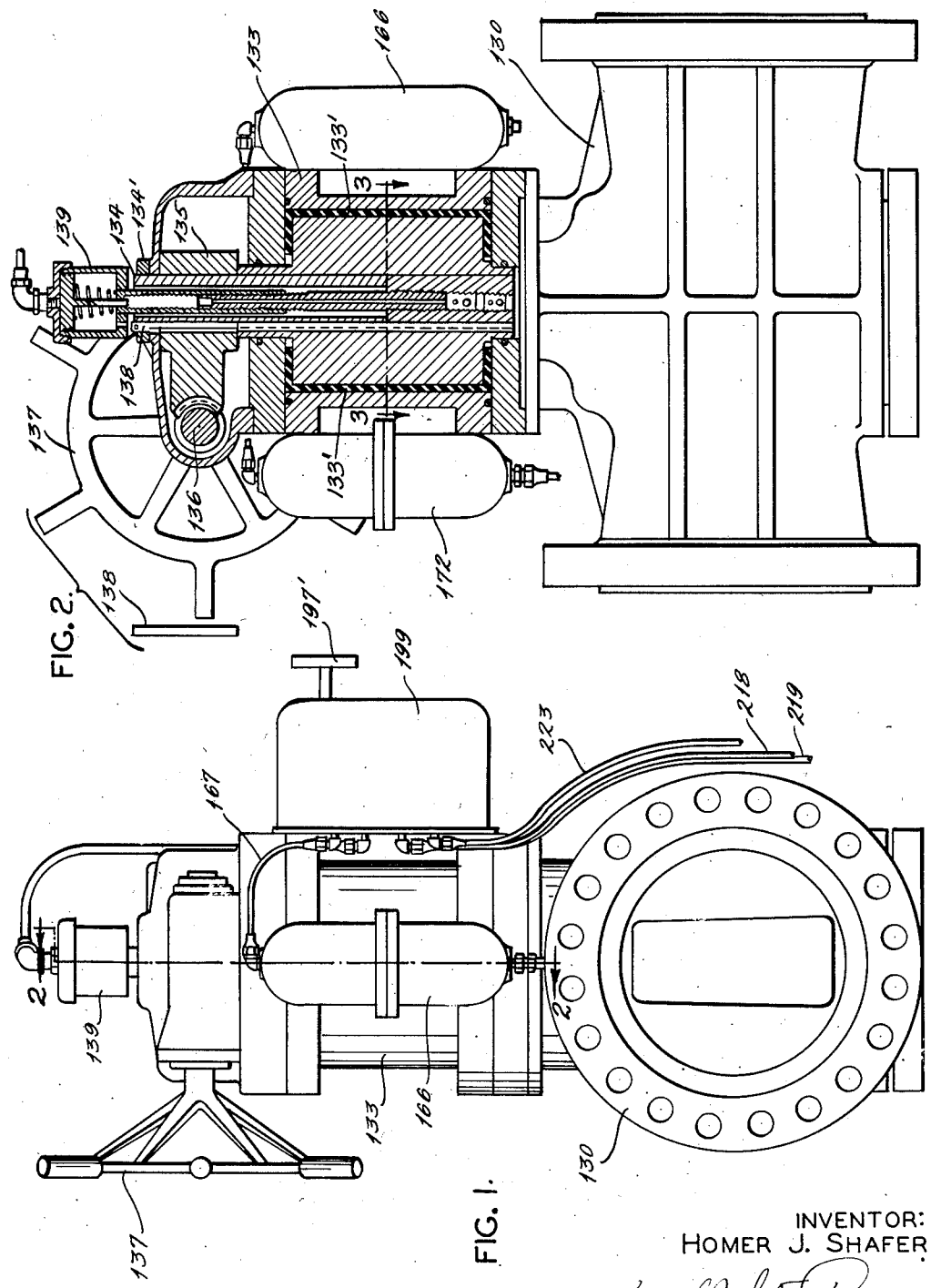
Feb. 5, 1957   H. J. SHAFER   2,780,432
AUTOMATIC RECLOSING DEVICE FOR PLUG TYPE VALVES
Filed Oct. 12, 1950   3 Sheets-Sheet 1
INVENTOR:
HOMER J. SHAFER
ATTORNEY.

Feb. 5, 1957 H. J. SHAFER 2,780,432
AUTOMATIC RECLOSING DEVICE FOR PLUG TYPE VALVES
Filed Oct. 12, 1950 3 Sheets-Sheet 3

INVENTOR:
HOMER J. SHAFER
ATTORNEY.

United States Patent Office 2,780,432
Patented Feb. 5, 1957

2,780,432
AUTOMATIC RECLOSING DEVICE FOR PLUG TYPE VALVES

Homer J. Shafer, Mansfield, Ohio, assignor to Shafer Valve Company, Mansfield, Ohio, a corporation of Ohio Application October 12, 1950, Serial No. 189,810

5 Claims. (Cl. 251—59)

This invention relates to plug type high pressure valves and is more particularly directed to an operator for closing or opening this type of valve.

The primary object of the invention is to provide an operator for a plug type high pressure valve that is adapted for closing the valve upon a partial or total failure of pressure in the pipe line to which it is connected.

Another object of the invention is to provide an automatic operator for a plug type valve in which an auxiliary pressure supply is provided for adjusting the valve so that it will be actuated to closed position upon a failure in line pressure.

The invention consists in the provision of a valve equipped with means for actuating the movable element thereof, the actuating means being responsive to pressure conditions in the pipe line in which the valve is connected.

In the drawings:

Fig. 1 is an end elevational view of a plug type valve including a rotary motor for actuating the valve plug;

Fig. 2 is a side elevational view of the valve shown in Fig. 1 with parts in section taken substantially along the line 2—2 thereof;

Figure 3:
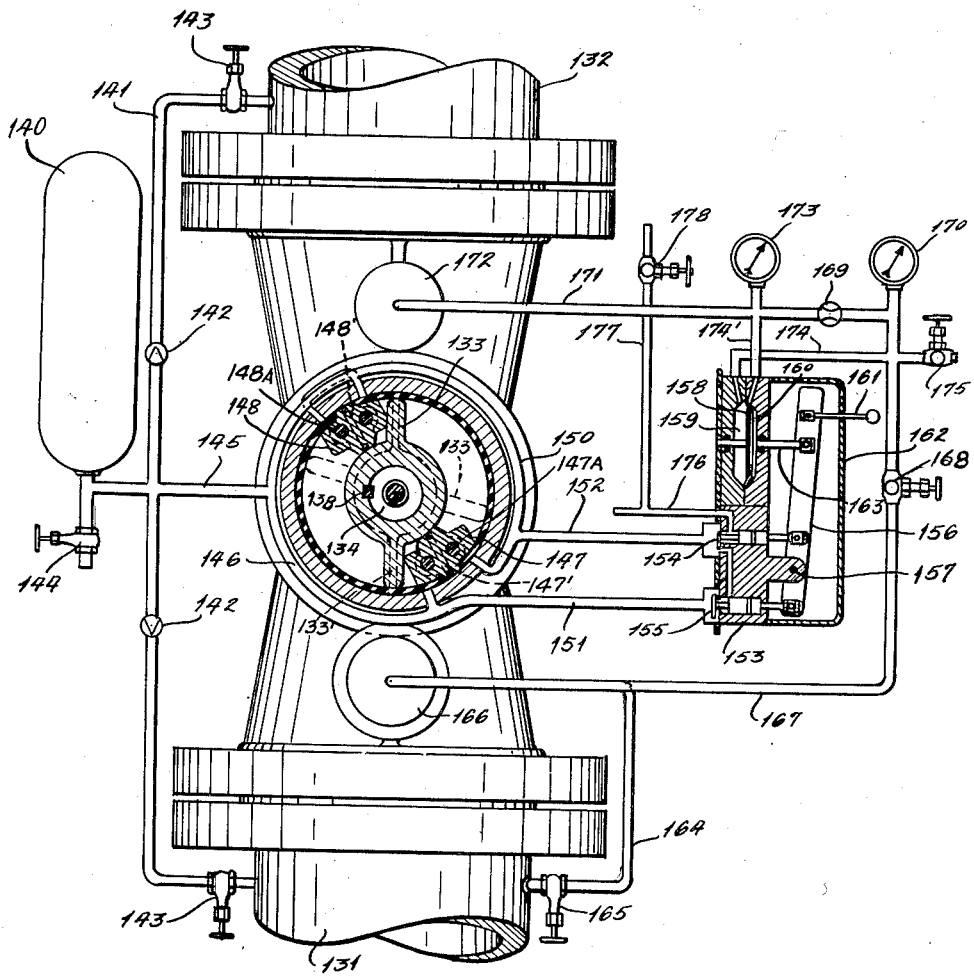
Figure 4:
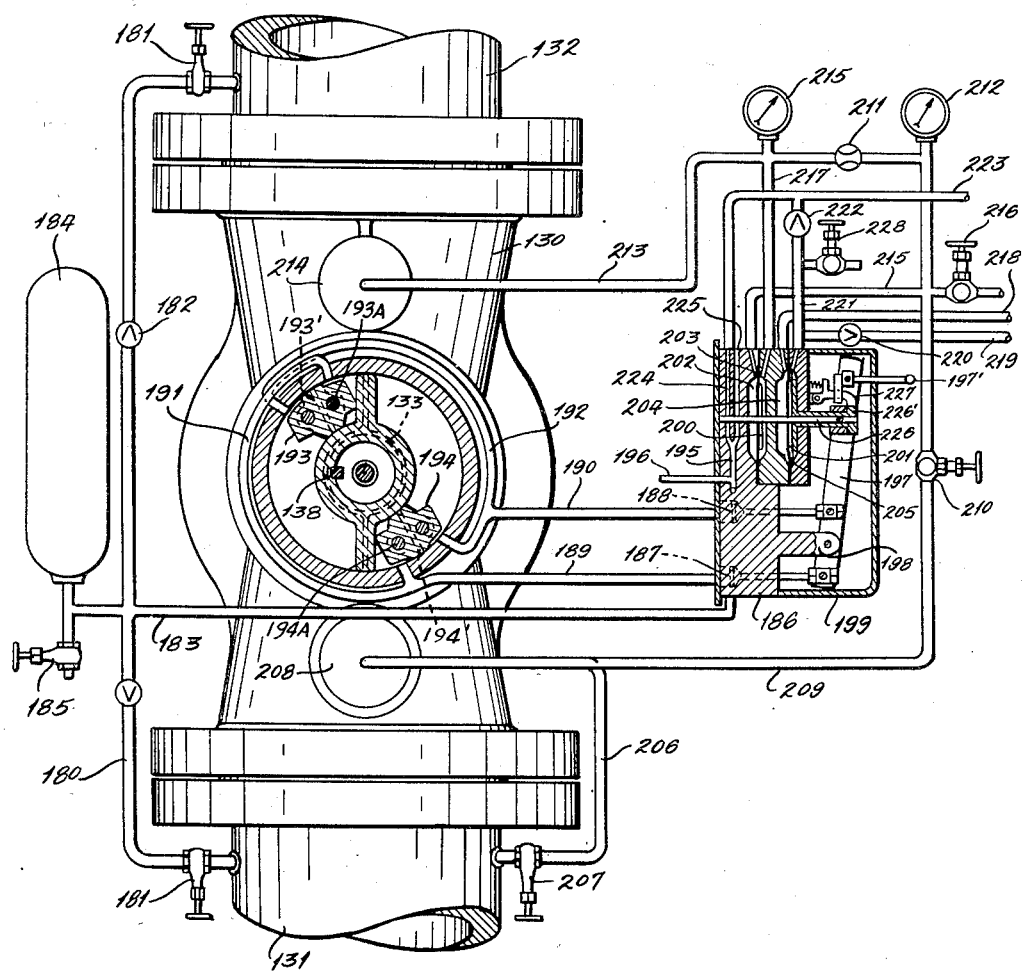

Fig. 3 is a view showing a valve similar to that set forth in Figs. 1 and 2 incorporating a single purpose valve control and taken in part along the line 3—3 of Fig. 2; and Fig. 4 is a view showing the valve of Figs. 1 and 2 incorporating an interlock control.

A form of the invention is illustrated in Figs. 1-3 in which a single purpose valve of the plug type is disclosed which comprises a body 130 to which pipes 131 and 132 are connected either one of which may be the high pressure or upstream side of the line. The valve body 130 has a rotatable plug therein (not shown). This plug may be rotated by a vane type rotary motor 133 comprising diametrically opposite vanes secured to the stem 134 constituting part of the valve plug. A worm gear segment 135 is secured to the stem and is engaged by a worm 136 formed on the shaft to which a handwheel 137 is secured. A short slip key 138 is fitted between segment 135 and stem 134 whenever the indicator 134' is to be used. When a long slip key 138' is installed the valve plug can be manually actuated and is removed when it is to be operated by the vane or impeller motor 133. A lubricating means 139 is provided for the valve plug that supplies lubricant through the valve stem 134 and rotary motor to the plug, and the lubricant means 139 is actuated by exhaust fluid from the control member, in a manner to be described.

Pressure fluid for the operation of motor 133 is derived from reservoir 140 connected to pipes 131 and 132 by a conduit 141 having check valves 142 and shut off valves 143. One of the valves 143 is connected on each side of the inlet to the reservoir. A drain valve 144 is provided for the reservoir. The reservoir is filled from the pipe line and the check valves 142 prevent the flow therefrom in the event pressure fails in one or both of the pipes 131 and 132 when the plug valve is closed. A conduit 145 is connected to the conduit 141 and the reservoir 140 and is also connected to the duct 146 in the valve body 130. This duct terminates at one side of each of the shoes 147 and 148 to communicate with diagonally opposite sides of the diametrically opposite vanes. A duct 150 is formed in the body 130 and terminates on the opposite side of each of the shoes 147 and 148 to communicate with the reverse sides of the vanes. Ducts 146 and 150 are connected to conduits 151 and 152 respectively and each terminates in the control member 153. The shoes 147 and 148 as well as each of the vanes of the motor have pressure sealing means therein for preventing the leakage of pressure fluid past the shoes and impeller as it is withdrawn from one side of the vane as the valve in the valve body is closed. This is true because the Fig. 3 disclosure is a single purpose valve and is manually reopened as will be subsequently described. The sealing means on the vanes is indicated at 133' and on the shoes at 147' and 148', respectively. Bolts 147A and 148A secure the shoes to the end walls of the motor chamber.

The control member 153 has a pair of poppet valves 154 and 155 therein for controlling the flow of pressure fluid toward and away from the opposite sides of the impeller 133. These valves are selectively actuated by a lever 156 to which the valves are suitably connected. The lever is pivoted to a boss 157 formed on the control device.

The lever 156 may be actuated by a diaphragm 158 clamped between the divided parts of the control device, the diaphragm being disposed in a cavity therein and forming chambers 159 and 160 in the control device. A plunger 163 is connected to the diaphragm and is pivotally connected to the lever 156. A cover 162 encloses the operating parts for the lever and a handle 161 projecting through the cover permits the lever to be manually actuated.

The diaphragm 158 is actuated by pressure fluid derived from the pipe line connected to the valve body. A conduit 164 having a shut off valve 165 therein is connected to the pipe 131 and is also connected to one end of a cylinder 166 containing a suitable dryer for the gas. A conduit 167 is connected to the other end of the cylinder and has a shut off valve therein. This conduit is also connected to a fitting 169 having a restricted orifice therein and a gage 170 connected to the conduit 167 measures the pressure of the fluid transmitted from the pipe 131. A conduit 171 is connected between the fitting 169 and the reservoir 172 and a gage 173 is connected to conduit 171 for measuring the pressure on the fluid in reservoir 172. A conduit 174' is connected between the conduit 171 and the chamber 160. A conduit 174 is connected between the chamber 159 and the conduit 167 and having a bleed valve 175 connected thereto. A conduit 176 is connected to the port controlled by exhaust valve 154 and a lubricating device 139 and a conduit 177 is also connected thereto having a valve 178 therein for regulating the exhaust flow from the conduit 176 and the parts connected thereto.

The adjustment of the parts in the valve in Fig. 3 indicates that the movable valve element in the body 130 is in the open position. If there is a drop in pressure in the pipe line 131, which may be considered the upstream or high pressure side, or if there is a total drop in pressure therein, chamber 159 will be similarly affected. This will enable pressure in reservoir 172 to be effective in chamber 160 thereby moving 158 to the left thus opening valve 154 and closing valve 155. The orifice in fitting 169 causes the diaphragm to be actuated before pressure loss occurs in reservoir 172. Exhaust pressure fluid will now flow through conduit 176 to the lubricant injector 139 and will also flow out of conduit 177 through valve 178. Pressure fluid derived from the pipe 131 or from reservoir 140 will flow through conduit 145 and duct 146 to start filling the space between the impeller 133 and the shoes 147 and 148, rotation continuing through approximately 90° of travel or until it occupies substantially the dotted line position.

The valve can be opened by reversely moving the diaphragm 158 and the connected lever 156, this being done manually. This closes valve 154 and opens valve 155 thus subjecting both sides of the impeller to line 131 or reservoir 140 pressure. The slip key 138 is now inserted whereupon handwheel 137 is rotated in the proper direction so that pressure fluid from the conduit 145 will flow into the space between the dotted line position of impeller 133 and the shoes, the impeller again occupying the full line position of the Fig. 3 disclosure. The slip key 138' is not inserted in the valve when it is operated by the impeller. During the time valves 143 and 168 are closed a test operation of the valve may be made by opening valve 175 which action simulates a drop or failure in pipe 131 pressure.

Fig. 4 illustrates an interlock control for a plug valve. Fig. 1 is an end view of the valve shown in Fig. 4 as well as for that shown in Figs. 2 and 3 and therefore the valve parts bear the same reference numerals. The hydraulic system is organized differently and this will be described in detail.

A conduit 180 is connected between the pipes 131 and 132 and has shut off valves 181 and check valves 182 connected therein on each side of the conduit 183 connected to a reservoir 184 to the conduit 180. A drain valve 185 is connected to the reservoir 184 in the manner shown.

Pressure fluid from the conduit 180 and reservoir 184 is conducted through the conduit 183 to the four way reversing valve 186 which selectively applies pressure fluid to the vanes of impeller 133 for reversely rotating the plug in the valve body. The conduit 183 connects with ducts in valve 186 which selectively lead to the two poppet valves 187 and the two poppet valves 188, only one valve of each being shown, so that pressure fluid may be selectively admitted to the conduits 189 and 190 that connect with ducts 191 and 192 respectively in the housing for the impeller 133. The latter ducts terminate in shoes 193 and 194 through which the pressure fluid is applied to the vanes of the impeller 133. The sealing means for the shoes 193 and 194 is indicated at 193' and 194', respectively, and bolts indicated at 193A and 194A secure the shoes to the end walls of the motor chamber. The spent fluid in the motor is selectively conducted through either of the conduits 189 or 190 to the valve 186 where through suitable ducts it is introduced into the duct 195. A portion of the fluid is conducted through conduit 196 to a lubricating device for the plug valve similar to those described above.

The valve pairs 187 and 188 are selectively actuated by a lever 197 pivotally secured to a boss 198 formed on the casing for valve 186. The stems of the valves are suitably pivotally secured to the lever 197. This lever may be manually actuated by a handle 197' extending through a cover 199 for the operating mechanism mounted on the casing for valve 186 or it may be actuated by a pressure responsive device mounted on the valve casing.

This pressure fluid responsive device is made up of a multipart body in which diaphragms 200 and 201 are interposed. The body or casing parts have cavities formed therein in which the diaphragms operate and divide those cavities into chambers 202, 203, 204 and 205. These diaphragms are actuated by pressure fluid derived from the pipe line, a supplemental air supply, or from exhaust pressure fluid impulses derived from other valves in the system in which the instant valve is connected.

The conduit 206 has a shut off valve 207 connected therein and is connected to the pipe 131. The conduit is also connected to one end of a cylinder 208 containing a suitable substance for drying the fluid conducted thereto. A conduit 209 is connected to the other end of the cylinder 208 and has a shut off valve 210 inserted therein. The conduit 209 is connected to a fitting 211 having a restricted orifice therein and a gage 212 is connected to the conduit for the purpose of measuring pressure in the fluid derived from the pipe 131. A conduit 213 is connected to the fitting 211 and conducts fluid to the reservoir 214 and a gage 212' is connected to the conduit for measuring reservoir pressure.

A conduit 215 connects conduit 209 with chamber 202, a bleed valve 216 being connected in the conduit for test purposes. A conduit 217 is connected to the chamber 203 and to the conduit 213 thereby subjecting both sides of the diaphragm 200 to pipe line pressure and making it responsive to drops or failure of pressure in pipe 131. The chamber 204 has an air line 218 connected thereto for actuating diaphragm 201 from a remote location. The chamber 205 is connected to the air line 219 having a check valve 220 inserted therein, the conduit being connected to the conduit 221 having a check valve 222 therein. The conduit 221 is also connected to exhaust impulse conduit 223 with the conduit 221 connected to the chamber 205. An exhaust restricting valve 228 is connected in the conduit 221. The conduit 223 connects with a duct 224 formed in the casing for valve 186, the casing also having an exhaust duct 225 leading to atmosphere. A plunger 226 connects the diaphragm 200 with the lever 197 and a sleeve 226' connects diaphragm 201 with the lever 197, there being a suitable pin and slot connection therebetween so that under certain conditions diaphragm 201 may be actuated by the lever without disturbing the setting of diaphragm 200. The left hand end of the plunger 226 constitutes a valve for directing the exhaust pressure fluid to atmosphere or to the conduit 223 which leads to a companion valve whose operation is responsive to the instant valve, the arrangement being such that the companion valve is closed when the instant valve is closed. A latch 227 is provided for locking the lever 197 in valve open position when it has been operated automatically.

Assuming that the valve is in the open position as indicated and that a drop in pressure or total failure in pressure has occurred in the pipe 131 the following action takes place. Pipe line pressure failure will cause a drop in pressure or failure of pressure in the chamber 202. The pressure in chamber 203 derived from the reservoir 214 forces the diaphragm in such a direction that the lever 197 will open valves 188 and close valves 187 thus causing the plug in valve body to move to closed position and a reverse motion will move it to open position. When the control has been tripped by reason of a pressure drop and the valve has been closed it must be manually reset to place the station, in which the valve is located, back in service. The latch 227 is for the purpose of preventing an accidental operation. A valve connected to the air line 218 located at a remote station can be operated for admitting pressure fluid to the chamber 204 to thus shift the position of lever 197. Any fluid present in chamber 205 will be exhausted through the valve 228. An impulse in the conduit 223 derived from a companion valve will also actuate the diaphragm to the left for changing the positions of the valves 187 and 188. When the plug valve is in closed position it may be actuated to open position by a remotely located valve in the air line 219. The check valves 220 and 222 prevent exhaust impulses and compressed air being admitted to the conduits 219 or 223. A simulated pipe line pressure drop may be effected by opening valve 216. The plug valve may be manually operated in the same manner as in the Fig. 3 disclosure. The lubricating device connected to the conduit 196 functions in relation to exhaust duct 226 and valve on the end of rod 26 in the same manner as described in connection with Fig. 3.

That which is regarded new, novel and useful and which is sought to be protected by Letters Patent of the United States is as follows:

1. An operator for a rotary plug valve comprising a fluid motor having a cylindrical housing with end plates, at least one of said end plates being detachably secured to said housing, a rotor connected directly to the valve plug and having two diametrically opposite vanes traversing said housing, two diametrically opposite shoes between the vanes forming chambers on each side of the vanes, pressure sealing means extending continuously around the vanes between the vanes and the housing and extending continuously around the shoes between the shoes and the housing and the rotor, means securing the shoes and end plates together, conduit means communicating with both sides of said vanes, and means for conducting pressure fluid through said conduit means to diagonally opposite sides of said diametrically opposite vanes for turning the valve and for simultaneously conducting pressure fluid away from the reverse sides of said vanes.

2. An operator for a rotary plug valve comprising a fluid motor having a cylindrical housing with end plates, at least one of said end plates being detachably secured to said housing, a rotor connected directly to the valve plug and having two diametrically opposite vanes traversing said housing, two diametrically opposite shoes between the vanes forming chambers on each side of the vanes, pressure sealing means between the vanes and the housing and between the shoes and the housing and the rotor, means securing the shoes and end plates together, conduit means communicating with both sides of said vanes, a source of fluid pressure, control valve means for conducting pressure fluid from said source to diagonally opposite sides of said diametrically opposite vanes to turn the valve and for simultaneously connecting the reverse sides of said vanes with exhaust, and means for manually operating said control valve means.

3. An operator for a rotary plug valve connected in a pipe line comprising a fluid motor having a cylindrical housing with end plates, at least one of said end plates being detachably secured to said housing, a rotor connected directly to the valve plug and having two diametrically opposite vanes traversing said housing, two diametrically opposite shoes between the vanes forming chambers on each side of the vanes, pressure sealing means extending continuously around the vanes between the vanes and the housing and extending continuously around the shoes between the shoes and the housing and the rotor, means securing the shoes and end plates together, conduit means communicating with both sides of said vanes, control valve means for conducting pipe line pressure to diagonally opposite sides of said diametrically opposite vanes to turn the valve and for simultaneously connecting the reverse sides of said vanes with exhaust, and lever means for manually operating said control valve means.

4. An operator for a rotary plug valve connected in a pipe line comprising a fluid motor having a cylindrical housing with end plates, at least one of said end plates being detachably secured to said housing, a rotor connected directly to the valve plug and having two diametrically opposite vanes traversing said housing, two diametrically opposite shoes between the vanes forming chambers on each side of the vanes, pressure sealing means extending continuously around the vanes between the vanes and the housing and extending continuously around the shoes between the shoes and the housing and the rotor, means securing the shoes and end plates together, conduit means communicating with both sides of said vanes, control valve means responsive to a drop in pipe line pressure for conducting pipe line pressure to diagonally opposite sides of said diametrically opposite vanes to turn the valve in one direction and for simultaneously connecting the reverse sides of said vanes with exhaust, and means for manually operating said rotor to turn the plug valve.

5. An operator for a rotary plug valve comprising a fluid motor having a cylindrical housing with end plates, at least one of said end plates being detachably secured to said housing, a rotor connected directly to the valve plug and having two diametrically opposite vanes traversing said housing, two diametrically opposite shoes between the vanes forming chambers on each side of the vanes, pressure sealing means between the vanes and the housing and between the shoes and the housing and the rotor, means securing the shoes and end plates together, conduit means communicating with both sides of said vanes, means for conducting pressure fluid through said conduit means to diagonally opposite sides of said diametrically opposite vanes for turning the valve and for simultaneously conducting pressure fluid away from the reverse sides of said vanes, and means operatively connected to said fluid motor for supplying lubricant to the valve plug.

References Cited in the file of this patent

UNITED STATES PATENTS

| | | |
|---|---|---|
| 1,668,062 | Foerch | May 1, 1928 |
| 1,893,462 | Wait | Jan. 3, 1933 |
| 1,904,320 | Marples | Apr. 18, 1933 |
| 2,049,233 | Thomas | July 28, 1936 |
| 2,054,259 | Kinzie (II) | Sept. 15, 1936 |
| 2,055,449 | Beckwith | Sept. 22, 1936 |
| 2,148,410 | Wait | Feb. 21, 1939 |
| 2,262,539 | Shafer | Nov. 11, 1941 |
| 2,295,667 | Kinzie | Sept. 15, 1942 |
| 2,381,447 | Hedene | Aug. 7, 1945 |
| 2,435,968 | Kalix | Feb. 17, 1948 |
| 2,444,391 | Whitfield | June 29, 1948 |
| 2,451,689 | Nelson | Oct. 19, 1948 |
| 2,474,355 | Griswold | June 28, 1949 |
| 2,511,844 | Grove | June 20, 1950 |
| 2,530,722 | Petrie | Nov. 21, 1950 |
| 2,663,290 | Walder | Dec. 22, 1953 |

FOREIGN PATENTS

| | | |
|---|---|---|
| 396,502 | Germany | June 3, 1924 |
| 562,084 | Great Britain | June 16, 1944 |